(12) United States Patent
Dal Mutto et al.

(10) Patent No.: US 9,619,042 B2
(45) Date of Patent: *Apr. 11, 2017

(54) SYSTEMS AND METHODS FOR REMAPPING THREE-DIMENSIONAL GESTURES ONTO A FINITE-SIZE TWO-DIMENSIONAL SURFACE

(71) Applicant: Aquifi, Inc., Palo Alto, CA (US)

(72) Inventors: Carlo Dal Mutto, Sunnyvale, CA (US); Giuliano Pasqualotto, Sunnyvale, CA (US); Giridhar Murali, Sunnyvale, CA (US); Michele Stoppa, Sunnyvale, CA (US); Amir hossein Khalili, Sunnyvale, CA (US); Ahmed Tashrif Kamal, San Jose, CA (US); Britta Hummel, Berkeley, CA (US)

(73) Assignee: Aquifi, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/282,219

(22) Filed: Sep. 30, 2016

(65) Prior Publication Data
US 2017/0017307 A1    Jan. 19, 2017

Related U.S. Application Data

(63) Continuation of application No. 14/704,761, filed on May 5, 2015, now Pat. No. 9,501,138.
(Continued)

(51) Int. Cl.
*G06F 3/01* (2006.01)
*G06T 7/00* (2017.01)
(Continued)

(52) U.S. Cl.
CPC ......... *G06F 3/017* (2013.01); *G06K 9/00355* (2013.01); *G06T 7/0044* (2013.01);
(Continued)

(58) Field of Classification Search
CPC .............................. G06F 3/017; G06F 3/0425
See application file for complete search history.

(56) References Cited

U.S. PATENT DOCUMENTS 8,615,108 B1    12/2013 Stoppa et al.
8,655,021 B2    2/2014 Dal Mutto et al.
(Continued)

OTHER PUBLICATIONS

Hinterstoisser, Stefan, at al., "Gradient Response Maps for Real-Time Detection of Texture-Less Objects," IEEE Transactions on Pattern Analysis and Machine Intelligence, vol. 34, No. 5, pp. 1-14, May 2012.

*Primary Examiner* — Kevin M Nguyen
(74) *Attorney, Agent, or Firm* — Lewis Roca Rothgerber Christie LLP

(57) ABSTRACT

A method for operating a real-time gesture based interactive system includes: obtaining a sequence of frames of data from an acquisition system; comparing successive frames of the data for portions that change between frames; determining whether any of the portions that changed are part of an interaction medium detected in the sequence of frames of data; defining a 3D interaction zone relative to an initial position of the part of the interaction medium detected in the sequence of frames of data; tracking a movement of the interaction medium to generate a plurality of 3D positions of the interaction medium; detecting movement of the interaction medium from inside to outside the 3D interaction zone at a boundary 3D position; shifting the 3D interaction zone relative to the boundary 3D position; computing a plurality of computed positions based on the 3D positions; and supplying the computed positions to control an application.

30 Claims, 9 Drawing Sheets

Related U.S. Application Data

(60) Provisional application No. 61/988,845, filed on May 5, 2014.

(51) Int. Cl.
    *G06K 9/00*       (2006.01)
    *G06T 7/20*       (2017.01)

(52) U.S. Cl.
    CPC ............ *G06T 7/204* (2013.01); *G06T 7/2093* (2013.01); *G06T 2207/10028* (2013.01); *G06T 2207/30196* (2013.01)

(56) References Cited

U.S. PATENT DOCUMENTS

| | | |
|---|---|---|
| 2004/0189720 A1 | 9/2004 | Wilson et al. |
| 2012/0327125 A1 | 12/2012 | Kutliroff et al. |
| 2013/0069876 A1 | 3/2013 | Cheng et al. |
| 2015/0316996 A1* | 11/2015 | Dal Mutto ............ G06T 7/2053 345/156 |

* cited by examiner

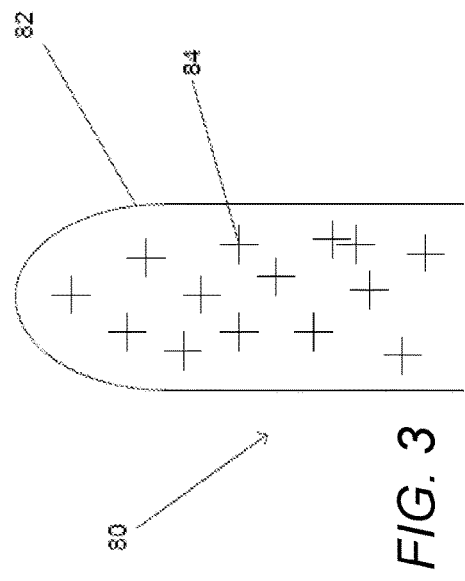
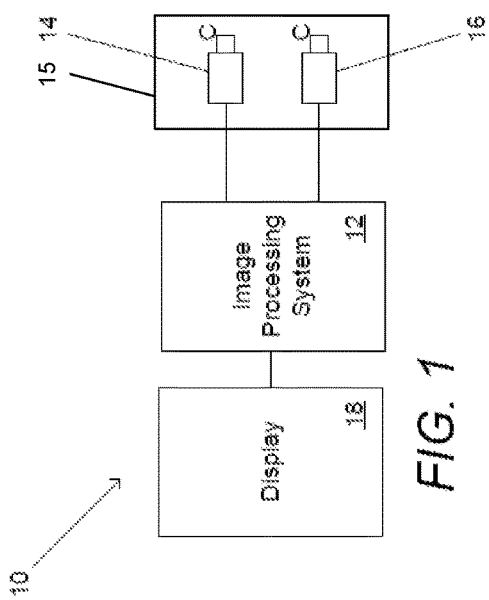
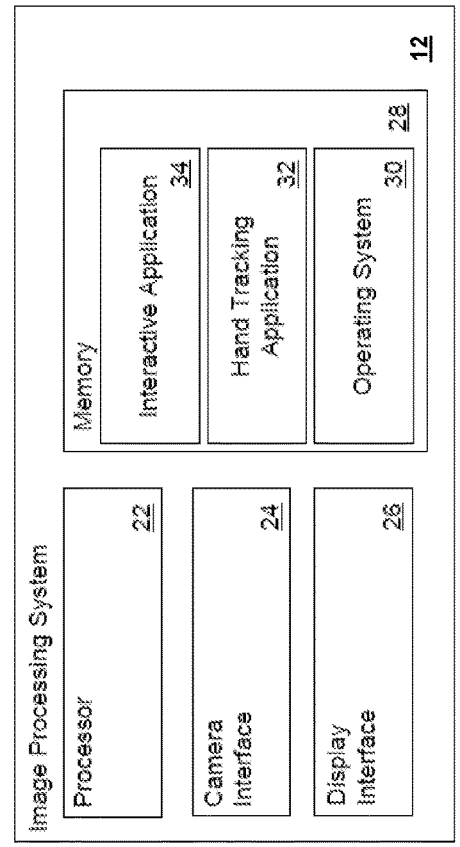
FIG. 1
FIG. 2
FIG. 3

SYSTEMS AND METHODS FOR REMAPPING THREE-DIMENSIONAL GESTURES ONTO A FINITE-SIZE TWO-DIMENSIONAL SURFACE

CROSS-REFERENCE TO RELATED APPLICATION(S)

This application is a continuation of U.S. patent application Ser. No. 14/704,761, filed May 5, 2015, which claims the benefit of U.S. Provisional Patent No. 61/988,845, titled "Systems and Methods for Remapping Three-Dimensional Gestures onto a Finite-Size Two-Dimensional Surface," filed in the United States Patent and Trademark Office on May 5, 2014, the entire disclosures of which are incorporated herein by reference.

BACKGROUND

Aspects of embodiments of the present invention relate to systems and methods for capturing three dimensional gestures and mapping the captured gestures onto a user interface for a finite-sized two-dimensional surface. Such systems and methods may be implemented by computing devices including mobile phones, tablets, desktop and laptop computers, etc.

Three dimensional gesture-based user interface systems may use depth map acquisition systems to detect a gesture made by a user. These gestures may be detected without the user's making physical contact with a portion of the device (e.g., without touching a screen or pressing a button).

Computational and energy efficiency of such gesture-based user interface systems may be considerations in processing and power constrained environments such as mobile devices. Furthermore, higher computational efficiency may result in better user experiences due to reduced lag and better responsiveness.

SUMMARY

Aspects of embodiments of the present invention are directed to systems and methods for providing a real-time gesture based user interface system. Some embodiments of the present invention are directed to systems and methods for improving computational efficiency of detecting gestures. Some embodiments are directed to systems and methods for providing user friendly interfaces.

According to one embodiment, a real-time gesture based interactive system includes: a processor; an acquisition system configured to capture a sequence of frames of data for constructing a depth map of a field of view of the acquisition system; memory storing an interaction medium tracking application, the interaction medium tracking application configuring the processor to: obtain frames of data from the acquisition system; compare successive frames of the frames of data for portions that change from one frame to the next; determine whether any of the portions that changed are part of an interaction medium detected in the sequence of frames of data; define an inner 3D interaction zone relative to an initial position of the part of the interaction medium detected in the sequence of frames of data, where the inner 3D interaction zone corresponds to a bounded region that is less than the frame of data and that contains the part of the interaction medium detected in the sequence of frames of data; track a movement of the interaction medium in the data to generate a plurality of 3D positions of the interaction medium; detect movement of the interaction medium from inside to outside the inner 3D interaction zone at a boundary 3D position; shift the inner 3D interaction zone relative to the boundary 3D position; compute a plurality of computed positions based on the 3D positions; and supply the computed positions to control an application. In one embodiment, the computed positions are 2D positions.

Each of the computed positions may include an x component, a y component, and a z component.

The acquisition system may include at least one of: a plurality of cameras in a stereo arrangement having overlapping fields of view; an infrared camera; a color visible light camera; and an illumination source configured to generate at least one of visible light, infrared light, ultrasonic waves, and electromagnetic signals.

The memory may further store instructions of the interaction medium tracking application to configure the processor to: compute a 3D velocity of the interaction medium within the inner 3D interaction zone based on the 3D positions; and compute two-dimensional movement data corresponding to the 3D positions and the 3D velocity, differences in the two-dimensional movement data being non-linear with respect to differences in the 3D positions.

The interaction medium may be a portion of a human body.

The memory may further store instructions of the interaction medium tracking application to configure the processor to shift the inner 3D interaction zone relative to the boundary 3D position by computing a convex combination of the boundary 3D position and the center of the inner 3D interaction zone.

The memory may further store instructions of the interaction medium tracking application to configure the processor to detect the movement of the interaction medium from the inside to the outside of the inner 3D interaction zone based on the 3D positions.

The memory may further store instructions of the interaction medium tracking application to configure the processor to detect the movement of the interaction medium from the inside to the outside of the inner 3D interaction zone by detecting a coarse movement of the interaction medium within an entire portion of the field of view of the acquisition system.

The memory may further store instructions of the interaction medium tracking application to configure the processor to: detect a disengagement event; and stop tracking the movement of the interaction medium in response to the disengagement event.

The memory may further store instructions of the interaction medium tracking application to configure the processor to detect the disengagement event by: comparing the interaction medium detected in the frames of data to a target configuration to generate a compatibility confidence level; and detecting the disengagement event when the confidence level is below a threshold level.

The memory may further store instructions of the interaction medium tracking application to configure the processor to detect the disengagement event by: comparing the interaction medium detected in the frames of data to a disengagement configuration;
and detecting the disengagement event when the disengagement configuration is detected.

The memory may further store instructions of the interaction medium tracking application to configure the processor to: define an outer 3D interaction zone surrounding the inner 3D interaction zone; and detect the disengagement event by detecting a movement of the interaction medium from inside to outside of both the inner 3D interaction zone and the outer 3D interaction zone within a disengagement time period.

The memory may further store instructions of the interaction medium tracking application to configure the processor to: track the movement of the interaction medium along a first direction toward a boundary of the inner interaction zone and concurrently update the plurality of computed positions in accordance with the movement along the first direction; shift the inner interaction zone along the first direction and concurrently stop updating the plurality of computed positions in accordance with movement along the first direction; and track the movement of the interaction medium along a second direction opposite the first direction and concurrently start updating the plurality of computed positions in accordance with the movement along the second direction.

According to one embodiment of the present invention, a real-time gesture based interactive system includes: a processor; an acquisition system configured to capture a sequence of frames of data for constructing a depth map of a field of view of the acquisition system; memory storing an interaction medium tracking application, the interaction medium tracking application configuring the processor to: obtain frames of data from the acquisition system; compare successive frames of the of frames of data for portions that change from one frame to the next; determine whether any of the portions that changed are part of an interaction medium detected in the sequence of frames of data; define an inner 3D interaction zone relative to an initial position of the part of the interaction medium detected in the sequence of frames of data, where the inner 3D interaction zone corresponds to a bounded region that is less than the frame of data and that contains the part of the interaction medium detected in the sequence of frames of data; track a movement of the interaction medium in the data to generate a plurality of 3D positions of the interaction medium; compute a 3D velocity of the interaction medium within the inner 3D interaction zone based on the 3D positions; compute a plurality of computed positions based on the 3D positions and the 3D velocity, differences in the computed positions being non-linear with respect to differences in the 3D positions; and supply the computed positions to control an application.

The 3D velocity may include a horizontal component $v_x$ and a vertical component $v_y$ and wherein the 3D velocity is thresholded by a minimum threshold $T_m$ and a maximum threshold $T_M$ to compute thresholded 3D velocities a and b, where:

$$a = \min(\max(|v_x^t|, T_m), T_M)$$

$$b = \min(\max(|v_y^t|, T_m), T_M).$$

The real-time gesture based interactive system may further include a display device having $S_w$ columns and $S_h$ rows, wherein the plurality of computed positions includes column data c and row data r corresponding to coordinates of the display device, and wherein the 3D velocity and the thresholded 3D velocities are mapped onto the column data c and the row data r, where:

$$c_t = \min(\max(c_{t-1} - v_x^t * K * a, 0), S_w)$$

$$r_t = \min(\max(r_{t-1} - v_y^t * K * b, 0), S_h).$$

and where K is a sensitivity parameter.

The 3D velocity may be an average of a plurality of velocities computed during a time window.

According to one embodiment of the present invention, a method for operating a real-time gesture based interactive system includes: obtaining a sequence of frames of data from an acquisition system configured to capture data for constructing a depth map of a field of view of the acquisition system; comparing, by a processor, successive frames of the frames of data for portions that change from one frame to the next; determining, by the processor, whether any of the portions that changed are part of an interaction medium detected in the sequence of frames of data; defining, by the processor, an inner 3D interaction zone relative to an initial position of the part of the interaction medium detected in the sequence of frames of data, where the inner 3D interaction zone corresponds to a bounded region that is less than the frame of data and that contains the part of the interaction medium detected in the sequence of frames of data; tracking, by the processor, a movement of the interaction medium in the data to generate a plurality of 3D positions of the interaction medium; detecting, by the processor, movement of the interaction medium from inside to outside the inner 3D interaction zone at a boundary 3D position; shifting, by the processor, the inner 3D interaction zone relative to the boundary 3D position; computing, by the processor, a plurality of computed positions based on the 3D positions; and supplying the computed positions to control an application.

The acquisition system may include at least one of: a plurality of cameras in a stereo arrangement having overlapping fields of view; an infrared camera; a color visible light camera; and an illumination source configured to generate at least one of visible light, infrared light, ultrasonic waves, and electromagnetic signals.

The method may further include: computing a 3D velocity of the interaction medium within the inner 3D interaction zone based on the 3D positions; and computing two-dimensional movement data corresponding to the 3D positions and the 3D velocity, differences in the two-dimensional movement data being non-linear with respect to differences in the 3D positions.

The interaction medium may be a portion of a human body.

The method may further include: shifting the inner 3D interaction zone relative to the boundary 3D position by computing a convex combination of the boundary 3D position and the center of the inner 3D interaction zone.

The method may further include detecting the movement of the interaction medium from the inside to the outside of the inner 3D interaction zone based on the 3D positions.

The may further include detecting the movement of the interaction medium from the inside to the outside of the inner 3D interaction zone by detecting a coarse movement of the interaction medium within an entire portion of the field of view of the acquisition system.

The method may further include: detecting a disengagement event; and stopping tracking the movement of the interaction medium in response to the disengagement event.

The detecting the disengagement event may include: comparing the interaction medium detected in the frames of data to a target configuration to generate a compatibility confidence level; and detecting the disengagement event when the confidence level is below a threshold level.

The detecting the disengagement event may include: comparing the interaction medium detected in the frames of data to a disengagement configuration; and detecting the disengagement event when the disengagement configuration is detected.

The method may further include: defining an outer 3D interaction zone surrounding the inner 3D interaction zone;

and detecting the disengagement event by detecting a movement of the interaction medium from inside to outside of both the inner 3D interaction zone and the outer 3D interaction zone within a disengagement time period.

The may further include: tracking the movement of the interaction medium along a first direction toward a boundary of the inner interaction zone and concurrently update the plurality of computed positions in accordance with the movement along the first direction; shifting the inner interaction zone along the first direction and concurrently stop updating the plurality of computed positions in accordance with movement along the first direction; and tracking the movement of the interaction medium along a second direction opposite the first direction and concurrently start updating the plurality of computed positions in accordance with the movement along the second direction.

According to one embodiment of the present invention, a method for tracking a gesture includes: obtaining a sequence of frames of data from an acquisition system configured to capture data for constructing a depth map of a field of view of the acquisition system; comparing, by a processor, successive frames of the frames of data for portions that change from one frame to the next; determining, by the processor, whether any of the portions that changed are part of an interaction medium detected in the sequence of frames of data; defining, by the processor, an inner 3D interaction zone relative to an initial position of the part of the interaction medium detected in the sequence of frames of data, where the inner 3D interaction zone corresponds to a bounded region that is less than the frame of data and that contains the part of the interaction medium detected in the sequence of frames of data; tracking, by the processor, a movement of the interaction medium in the data to generate a plurality of 3D positions of the interaction medium; computing, by the processor, a 3D velocity of the interaction medium within the inner 3D interaction zone based on the 3D positions; computing, by the processor, a plurality of computed positions based on the 3D positions and the 3D velocity, differences in the computed positions being non-linear with respect to differences in the 3D positions; and supplying, by the processor, the computed positions to control an application.

The 3D velocity may include a horizontal component $v_x$ and a vertical component $v_y$ and wherein the 3D velocity is thresholded by a minimum threshold $T_m$ and a maximum threshold $T_M$ to compute thresholded 3D velocities a and b, where:

$$a = \min(\max(|v_x^t|, T_m), T_M)$$

$$b = \min(\max(|v_y^t|, T_m), T_M).$$

The application may include a user interface displayed on a display device having $S_w$ columns and $S_h$ rows, wherein the plurality of computed positions comprises column data c and row data r corresponding to coordinates of the display device, and wherein the 3D velocity and the thresholded 3D velocities are mapped onto the column data c and the row data r, where:

$$c_t = \min(\max(c_{t-1} - v_x^t * K * a, 0), S_w)$$

$$r_t = \min(\max(r_{t-1} - v_y^t * K * b, 0), S_h).$$

and where K is a sensitivity parameter.

The 3D velocity may be an average of a plurality of velocities computed during a time window.

BRIEF DESCRIPTION OF THE DRAWINGS

The accompanying drawings, together with the specification, illustrate exemplary embodiments of the present invention, and, together with the description, serve to explain the principles of the present invention.

FIG. 1 is a block diagram of a gesture based interactive system according to one embodiment of the present invention.

FIG. 2 is a block diagram of an image processing system according to one embodiment of the present invention.

FIG. 3 is a conceptual illustration of a template that can be used to perform template matching of human fingers according to one embodiment of the present invention.

DETAILED DESCRIPTION

Figure 4:
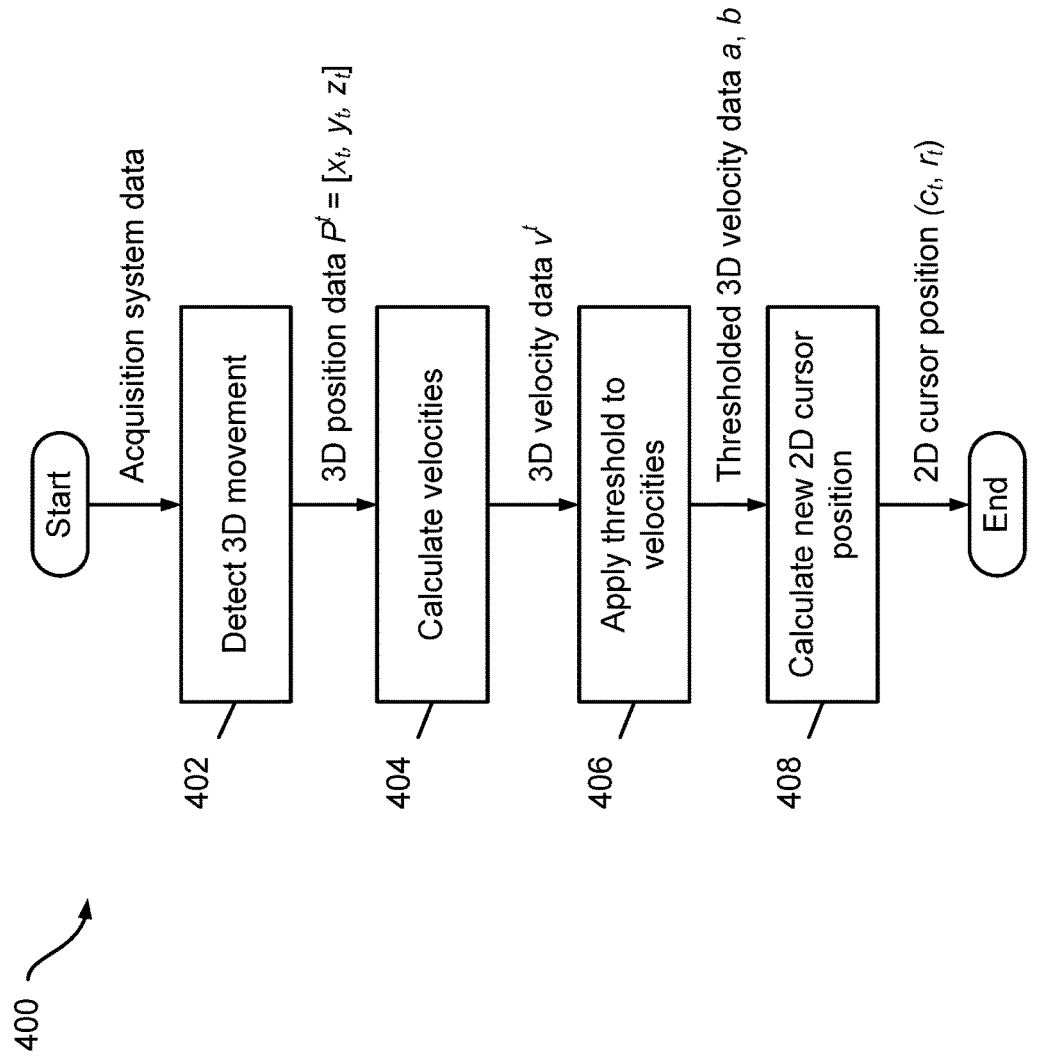
FIG. 4 is a flowchart illustrating a method for calculating a 2D cursor position from a 3D movement detected based on 3D data from an acquisition system.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

Some aspects of embodiments of the present invention are directed to systems and methods for providing a user interface with motion dependent inputs. According to some aspects, embodiments of the present invention allow a user to interact with a program, such as an operating system, a window manager, or a video game, by making gestures in front of an acquisition device (e.g., a camera) of a computing device such as a mobile phone, tablet computer, game console, or laptop computer. The user may form the gestures using body parts such as hands or fingers or by using a tool such as a stylus or wand. The computing device may use computer vision techniques to analyze data captured by the acquisition system (e.g., video data captured by the camera) to detect the gestures made by the user. Such gestures may be made without the user's making physical contact with the computing device with the gesturing part of the body (e.g., without pressing a button or touching a touch sensitive panel overlaid on a display). The object (e.g., the body part or tool) detected and tracked by the computing device to recognize the gestures will be referred to herein as the "interaction medium."

Examples of systems and methods for capturing and tracking gestures made by a user are disclosed in U.S. Pat. No. 8,615,108 "Systems and Methods for Initializing Motion Tracking of Human Hands," filed in the United States Patent and Trademark Office on Jul. 22, 2013, issued on Dec. 24, 2013, the entire disclosure of which is incorporated herein by reference and in U.S. Pat. No. 8,655,021 "Systems and Methods for Tracking Human Hands by Performing Parts Based Template Matching Using Images from Multiple Viewpoints," filed in the United States Patent and Trademark Office on Jul. 15, 2013, issued on Feb. 18, 2014, the entire disclosure of which is incorporated herein by reference.

Aspects of embodiments of the present invention are directed to systems and methods for improving user interaction experiences in gesture tracking systems. One aspect of embodiments of the present invention relates to a non-linear mapping between a detected gesture and the movement supplied to a user interface. For example, a cursor displayed in a user interface may move a distance that corresponds both to the distance moved by a detected finger and the speed with which the finger moved during the gesture.

Another aspect of embodiments of the present invention relates to reducing computational load by performing gesture detection only within an interaction zone smaller than an entire field of view of a gesture detection system and moving the location of the interaction zone as the user's interaction medium (e.g., a hand or a stylus) moves over time. Another aspect of embodiments of the present invention relates to methods for allowing a user to move an interaction zone without causing changes in the user interface.

Still another aspect of embodiments of the present invention relates to a disengagement gesture for allowing a user to disengage gesture tracking of the interaction medium.

FIG. 1 is a block diagram of a gesture based interactive system according to one embodiment of the present invention. Referring to FIG. 1, the gesture-based interactive system 10 includes an image processing system 12 configured to receive data captured by an acquisition system 15 which may include at least one camera 14, 16. In some embodiments, the gesture based interactive system 10 processes the captured data to determine the location and/or pose (e.g., orientation and shape) of a gesture made by a user, where the gesture may be performed by an interaction medium such as a body part (such as a hand, a finger, or an arm) or a control device (such as a stylus or wand). These gestures are generally performed at a distance from the gesture based interaction system (e.g., in the air and more than 6 inches from the acquisition system) with no physical contact between the interaction medium and the gesture based interactive system 10 (e.g., without contact with a touch sensitive panel). The image processing system 12 may be further coupled to a display device 18 for displaying data relating to an application (e.g., a drawing application) running on the image processing system 12.

FIG. 2 is a block diagram of an image processing system according to one embodiment of the present invention. The image processing system 12 includes a processor 22 that is configured to communicate with an acquisition system interface (or camera interface) 24 coupled to the acquisition system 15 and a display interface 26 coupled to the display device 18. The image processing system 12 also includes a memory 28, which can take the form of one or more types of storage including semiconductor and/or disk based storage. In the embodiment shown in FIG. 2, the processor 22 may be configured using an operating system 30 stored in the memory, but embodiments of the present invention are not limited thereto and may be utilized without an operating system. The memory 28 may also store a hand tracking application 32 (or interaction medium tracking application) and an interactive application 34. When the user executes hand gestures within the field of view of the acquisition system 15, the hand tracking application 32 processes data received via the acquisition system interface 24 (e.g., video image data from cameras) to track the interaction medium and to detect gestures. The data may be processed by the processor 22 to detect gestures and motion. The detected gestures and motion may then be supplied as user input data (or movement data) to the operating system 30 and/or the interactive application 34.

In various embodiments of the present invention, the image processing system 12 may be implemented in a variety of forms of hardware and software including, but not limited to, a general purpose processor coupled to dynamic and static memory, a graphics processing unit (GPU), a field programmable gate array (FPGA), an application specific integrated circuit (FPGA), and combinations thereof.

The acquisition system interface 24 may be an appropriate interface for connecting to peripheral devices such as a universal serial bus (USB) interface. The display interface 26 may be an interface for driving a display device such as a DVI interface, an HDMI interface, or a DisplayPort interface.

In some embodiments of the present invention, gestures made by a tracked interaction medium are used to control motion within an application 34 with respect to a 2D surface such as a display device 18 coupled to the image processing system 12 by remapping detected changes in 3D position of the interaction medium to changes in position on the 2D surface. For example, gestures may be used to control the movement of a cursor on the display device 18 to allow the selection of user interface elements on the display device. As another example, in a drawing application the cursor may also be used to identify the location of a drawing tool on a virtual canvas. As still another example, the gestures may be used to control the direction in which virtual player is looking in a three dimensional video game (e.g., controlling the look direction in a first person game). However, for the sake of convenience, these user inputs will be described herein as corresponding to the movement of a cursor on screen.

The interaction medium may be tracked using, for example, a template matching process utilizing a template similar to the template shown in FIG. 3. The illustrated template 80 defines an edge 82 and a plurality of pixel locations 84. The edge 82 can be utilized to perform edge detection using techniques including, but not limited to, the image gradient orientation technique disclosed in Hinterstoisser et al., "Gradient Response Maps for Real-Time Detection of Texture-Less Objects" *IEEE Transactions on Pattern Analysis and Machine Intelligence* (2012), the disclosure of which is incorporated by reference herein in its entirety. The pixel locations 84 can be utilized to identify surface pixels on a candidate feature for the purpose of performing skin color classification. Although a specific template is illustrated in FIG. 4, any of a variety of templates can be used to identify parts of a human hand in various configurations including, but not limited to, fingers, hands with one or more pointing fingers, closed and open hands, as well as other interaction media such as styluses and wands.

Generally, detecting gestures is performed within an interaction zone that is smaller than an entire space in which the acquisition system is capable of detecting gestures. For example, the interaction zone may only include a small portion within an entire field of view covered by the acquisition system 15.

In one embodiment of the present invention, a user may perform a "wake up gesture" using the interaction medium at a 3D position $P_w$ within the field of view of the acquisition system 15, where:

$$P_w = [x_w, y_w, z_w]^T$$

The interaction zone may then be initially defined as a cuboid centered at $P_w$ and having dimensions $\Delta_w = [\Delta_w^x, \Delta_w^y, \Delta_w^z]^T$. The movement of the interaction medium within the interaction zone generates 3D positions $P^t$ over time, where $P^t = [x^t, y^t, z^t]^T$, $t=0, 1, \ldots, T$ where the coordinates may correspond to, for example, the center of a detected fingertip, the center of a hand, or the tip of a stylus.

Points within the interaction zone may be remapped onto the display device 18 according to:

$$\begin{bmatrix} c \\ r \end{bmatrix} = \begin{bmatrix} \frac{\Delta_w^c}{\Delta_w^x} & 0 \\ 0 & \frac{\Delta_w^r}{\Delta_w^y} \end{bmatrix} \begin{bmatrix} x - x_w \\ y - y_w \end{bmatrix}$$

where c and r are the column and row of the remapped point within the reference frame of the display device 18, $\Delta_w^c$ and $\Delta_x^r$ are the number of columns and the number of rows on the screen, x and y are the current position of interaction medium along the x and y axes (e.g., parallel to the plane substantially equidistant from the acquisition device 15), and the point with coordinates $[r\ c]^T = [0\ 0]^T$ is the coordinate at center of the display device 18. The rows and columns $\Delta_w^c$ and $\Delta_w^r$ of the screen may correspond to the number of pixels in the width $S_w$ and height $S_h$ of the screen, but embodiments of the present invention are not limited thereto (e.g., a scaling factor may be applied between the rows and the height and between the columns and the width).

This methodology may be referred to as "linear" or "absolute" remapping, and allows the remapping of a 3D position in space to the screen in a manner that is substantially independent of the distance (along the z axis) from the acquisition system. This allows for a consistent user experience (e.g., the same size gestures may be used across the functional range of the acquisition system), and also allows the z component of the detected motion to be used for other functionalities. This also allows movement of the cursor to any point in the display device 18 by moving the user's body part or interaction device to a corresponding point in the interaction zone.

By limiting gesture detection to the interaction zone, computational load is reduced because only a limited region is analyzed for gestures. In addition, the detection of false positives, such as undesired moving objects outside of the interaction zone, is reduced.

On the other hand, using a linear remapping as described above requires the user to limit his or her interactions to gestures within the interaction zone. The location of the interaction zone may be fixed based on the wakeup position $P_w$. Moving the tracked hand out of the interaction zone may cause undesired effects. In addition, a user may lose track of the size or extent of the interaction zone and may therefore unintentionally exit the interaction zone during normal usage, which may frustrate the user. Further, non-linear acceleration, such as that typically used for computer mice and trackpads, is not easily implemented with a fixed interaction zone because such interactions generally result in a drifting effect. For example, when using a fixed interaction zone, if a user's hand repeatedly moves quickly to the left and slowly to the right, then after a few iterations it may no longer be possible to move a cursor to the right edge of the display.

As such, aspects of embodiments of the present invention are directed to moving the interaction zone in accordance with the movement of a user's body part (e.g., hand) or control device (e.g., stylus) while maintaining performance benefits of a fixed size interaction zone and while providing consistent mapping across the field of view of the acquisition system.

Non-Linear Interactions

As discussed above, in a linear remapping between three dimensional (3D) gestures and a two dimensional (2D) user interface, various points in 3D space are mapped directly to corresponding points in the 2D user interface. FIG. 4 is a flowchart illustrating a method for calculating a 2D cursor position from a 3D position detected based on 3D data from an acquisition system.

In one embodiment, assuming that the display device 18 is a display with a width of $S_w$ pixels and a height of $S_h$ pixels, and assuming that a wake up event occurs at time $t=0$, the coordinates of the interaction media are initialized to be $[x^0, y^0, z^0]^T$ and a cursor having coordinates (c, r) is initially mapped to the center of the screen:

$$\left[ c^0 = \frac{S_w}{2}, r^0 = \frac{S_h}{2} \right]^T$$

At each successive frame (t>0), the image processing system 12 receives data from the acquisition system 15 (e.g., video frame data from stereo cameras). The hand tracking application 32 then detects 3D movement in the received acquisition system data and generates positions $P^t$, where $P^t = [x^t, y^t, z^t]^T$, $t=0, 1, \ldots, T$ in operation 402. The 3D position data is then used in operation 404 to compute the 3D velocity $v^t$ of the gesture at time t as:

$$[v_x^t, v_y^t, v_z^t]^T = [x_t - x_{t-1}, y_t - y_{t-1}, z_t - z_{t-1}]^T$$

In some embodiments of the present invention, only the x and y components of the gestures (e.g., in a plane of points that are substantially equidistant from the acquisition system) are considered for remapping purposes, while the z component (e.g., along the axis of the acquisition system) may be used for other interactions such as zooming.

In addition, in some embodiments of the present invention, the magnitudes of the velocities in the x and y directions are thresholded, in operation 406, with a minimum threshold ($T_m$) and a maximum threshold ($T_M$), which can be either the same or different for the x and y directions. Thresholded velocities a and b for $v_x$ and $v_y$, respectively, may be computed as follows:

$$a = \min(\max(|v_x^t|, T_m), T_M)$$

$$b = \min(\max(|v_y^t|, T_m), T_M)$$

As such, according to one embodiment of the present invention, the hand tracking application 32 running on the image processing system 12 calculates, in operation 408, an updated computed position ($c_t$, $r_t$) of the cursor at time t:

$$c_t = \min(\max(c_{t-1} - v_x^t * K * a, 0), S_w)$$

$$r_t = \min(\max(r_{t-1} - v_y^t * K * b, 0), S_h)$$

where K is a sensitivity parameter controlling the sensitivity or gain of the movements on screen.

Therefore, by controlling the position of the cursor on the user interface (e.g., as displayed on the display device 18) based on the velocity of the gesture, where faster gestures of the same size result in larger movements on screen. This enables a more comfortable and intuitive gesture based control, where small, fast gestures may be used to move a cursor to distant portions of a display, while slow movements provide more precise control over the cursor. As such, differences in the generated 2D positions (e.g., between subsequent positions), or computed positions, on screen are non-linear with respect to the detected differences in the 3D positions (e.g., between subsequent positions) of the interaction medium.

The thresholds and iterative updates based on velocity also free a user from being forced to remain within a fixed interaction zone in order to maintain tracking, as will be described in more detail below.

In some embodiments of the present invention, the movement of the cursor $(c_t, r_t)$ may be smoothed by computing thresholded velocities a and b using average velocities computed over a time window instead of using instantaneous velocities $v_x^t$ and $v_y^t$. In some embodiments of the present invention, acceleration along the x and y directions is used to compute the cursor position $(c_t, r_t)$.

In some embodiments, position dependent mapping may also be used to cope with detection systems that are characterized by different detection performance in different positions. For example, greater levels of detection noise may appear at the edges of the field of view of the acquisition system. Therefore, greater amounts of smoothing may be applied when detecting gestures in those high noise regions. In addition, the remapping may be influenced by gesture detection confidence metrics supplied by the detection process.

Shifting Interaction Zone

Detecting gesturers across an entire field of view of an acquisition system can be computationally expensive and can result in detection errors. However, as discussed above, limiting gestures to a fixed interaction zone can result in frustrating user experiences.

According to one aspect of embodiments of the present invention, the interaction zone may track interaction media (e.g., the body part or the control device), thereby allowing use of the entire field of view of the acquisition device while maintaining the performance benefits of a limited interaction zone.

As discussed above, according to one embodiment, an initial interaction zone in which the detection is performed is defined based on the location of a wakeup event position $P_w = [x_w, y_w, z_w]^T$, and may be a cuboid of dimension $\Delta_w = [\Delta_w^x, \Delta_w^y, \Delta_w^z]^T$. Within the interaction zone $\Delta_w$, another smaller internal cuboid may also be defined as an inner interaction zone $\Delta_u$, with dimension $\Delta_u = [\Delta_u^x < \Delta_w^x, \Delta_u^y < \Delta_w^y, \Delta_u^z < \Delta_w^z]^T$ and also centered at $P_w$, the inner interaction zone $\Delta_u$ being surrounded by the outer interaction zone $\Delta_w$.

Figure 5A:
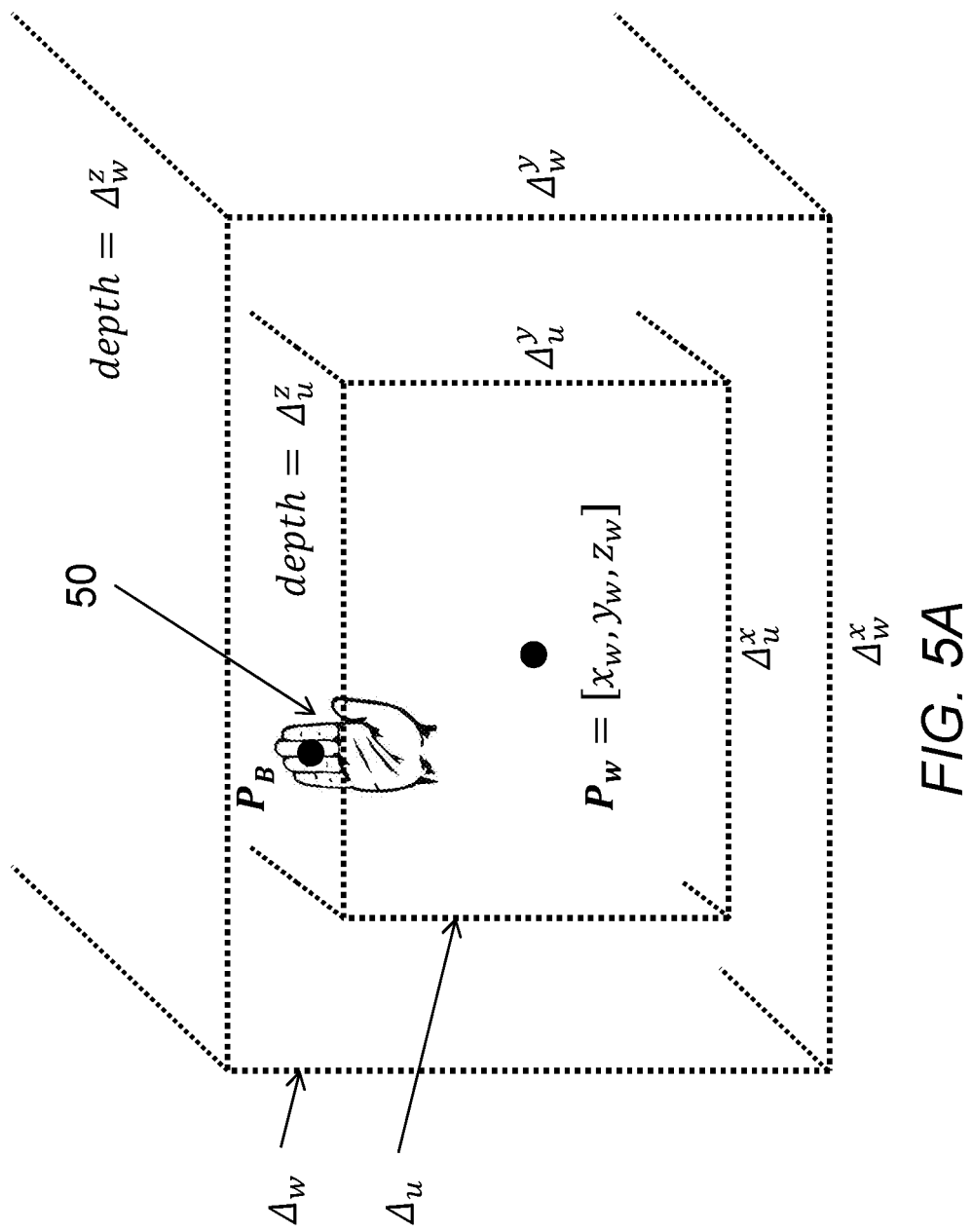
FIGS. 5A and 5B are conceptual illustrations of inner and outer interaction zones according to one embodiment of the present invention.
Figure 5B:
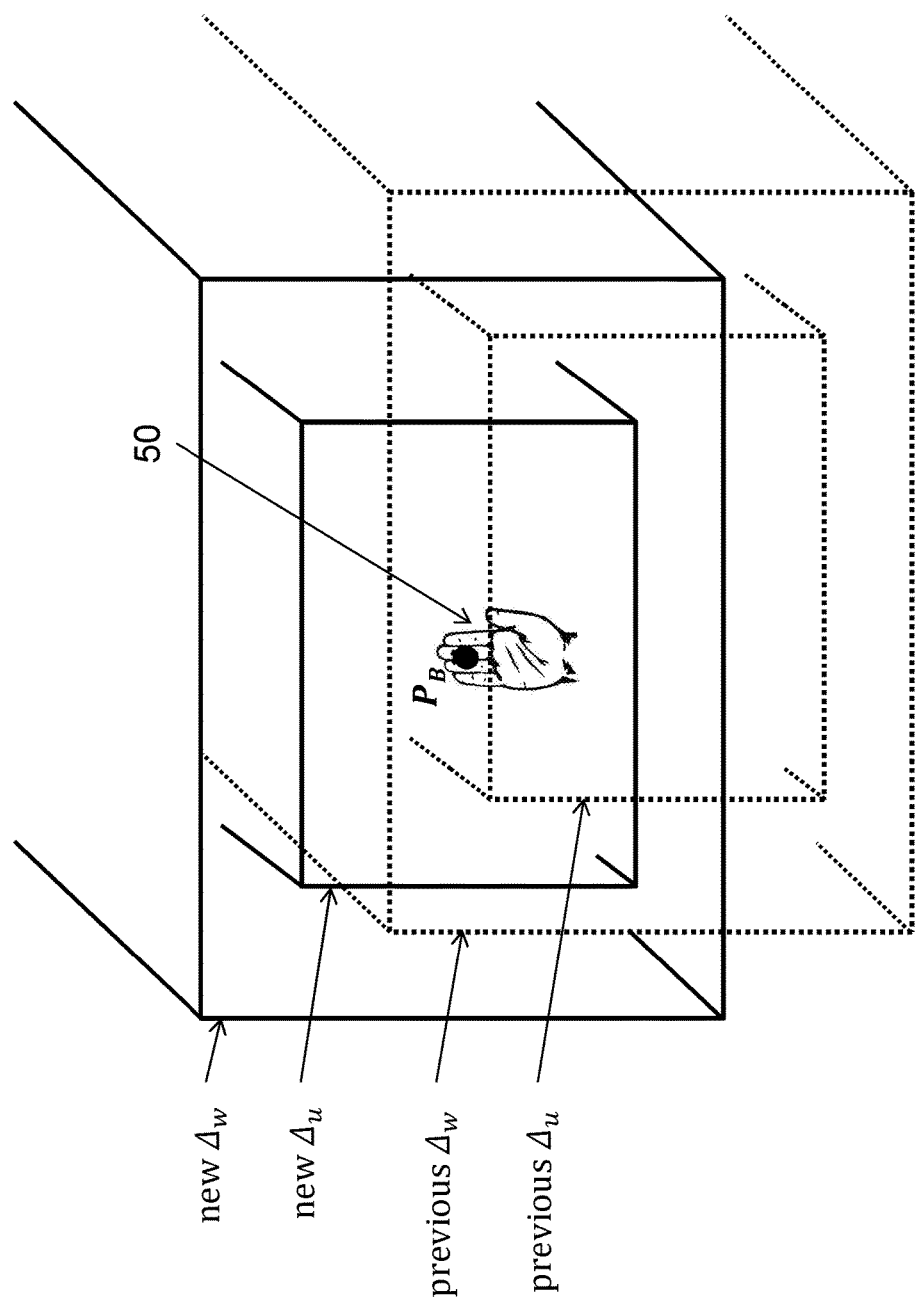
Figure 6:
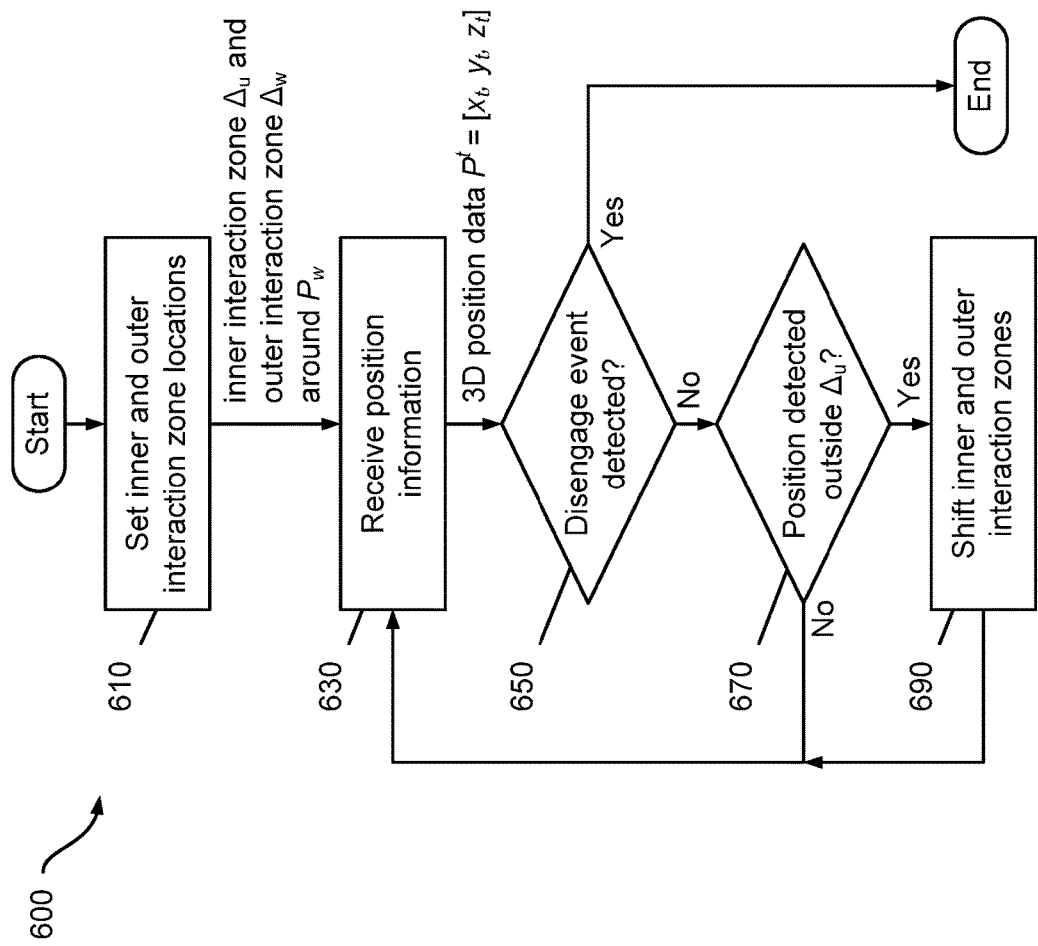
FIG. 6 is a flowchart illustrating a method for shifting an interaction zone according to one embodiment of the present invention.

FIGS. 5A and 5B are conceptual illustrations of inner and outer interaction zones according to one embodiment of the present invention and FIG. 6 is a flowchart illustrating a method for shifting an interaction zone according to one embodiment of the present invention.

Referring to FIG. 6, in one embodiment, the hand tracking application 32 running on the image processing system 12 sets the locations of the inner and outer interaction zones $\Delta_w$ and $\Delta_u$ in operation 610. FIG. 5A illustrates an initial position of the inner and outer interaction zones with dotted lines. As discussed above, these may be initially centered on the wakeup event position $P_w$. In operation 630, position information regarding the position of the interaction medium 50 is tracked as previously described to generate 3D position data $P^t$. While the interaction medium 50 is tracked within both the outer interaction zone $\Delta_w$ and the inner interaction zone $\Delta_u$, gesture detection is only performed within the smaller internal cuboid $\Delta_u$. If a disengage event is detected in operation 650 (described in more detail below), then the process ends.

When the hand tracking application 32 detects of movement of the interaction medium 50 out of the inner interaction zone $\Delta_u$ (e.g., at a boundary detection position $P_B$ outside of $\Delta_u$ and within $\Delta_w$) in operation 670, then the outer interaction zone $\Delta_w$ and the inner interaction zone $\Delta_u$ are shifted in operation 690 so as to include the boundary detection position $P_B$ (e.g., by re-centering the interaction zone and the inner interaction zone at the boundary detection position $P_B$ and continuing to track movement based on the updated interaction zone). FIG. 5B illustrates one example in which the interaction medium 50 has exited an upper part of the previsous inner interaction zone $\Delta_u$ (depicted in dotted lines in FIG. 5B) at boundary detection position $P_B$ and the subsequent shifting of the interaction zones to new interaction zones (depicted in solid lines in FIG. 5B) centered at $P_B$. After shifting the inner and outer interaction zones to new positions, the process repeats with receiving position information and continuing to shift the interaction zones as necessary to track the position of the interaction medium 50.

Some detection algorithms may use information about previous frames within the interaction zone in order to perform, for example, background subtraction or color modeling. In some embodiments, this data may be made available during tracking by maintaining a buffer of recently received frames of data from the acquisition system 15 while tracking and by gathering information about the scene in the shifted interaction zone from the buffered frames.

In some embodiments of the present invention, hysteresis may be used to provide smoother shifts of the interaction zone where, instead of re-centering the interaction zone at the boundary detection position $P_B$, the interaction zone is re-centered at a position that is a convex combination of the previous center of the interaction zone and of the boundary detection position $P_B$. In still other embodiments of the present invention, the update is performed only using the coordinates of the detection that are not within the inner interaction cuboid $\Delta_u$.

In still another embodiment of the present invention, a detection technique different from that used to detect gestures may be used to detect movement that triggers an update of the interaction zone. For example, a coarse detection technique may be applied to a larger detection region than the interaction zone. In one embodiment, a finger may be tracked as the interaction medium and the gesture detection method may track the fingertip within a relatively small interaction zone (e.g., using template based tracking or edge detection strategies) while movement out of the interaction zone may be detected by coarsely detecting the position of the hand in the entire field of view of the acquisition system (or within a larger region that includes the interaction zone). The coarse position of the hand can then be used to re-center the interaction zone while maintaining more refined detection of the position of the finger within the interaction zone.

Disengagement

In the case of a fixed interaction zone, a user could disengage (e.g., cause the system to stop tracking gestures) by moving the interaction medium (e.g., body part or stylus) out of the interaction zone. However, such a disengagement gesture would not work easily in embodiments of the present invention in which the interaction zone dynamically tracks or follows the movement of the interaction medium throughout the field of view of the acquisition system.

Figure 7A:
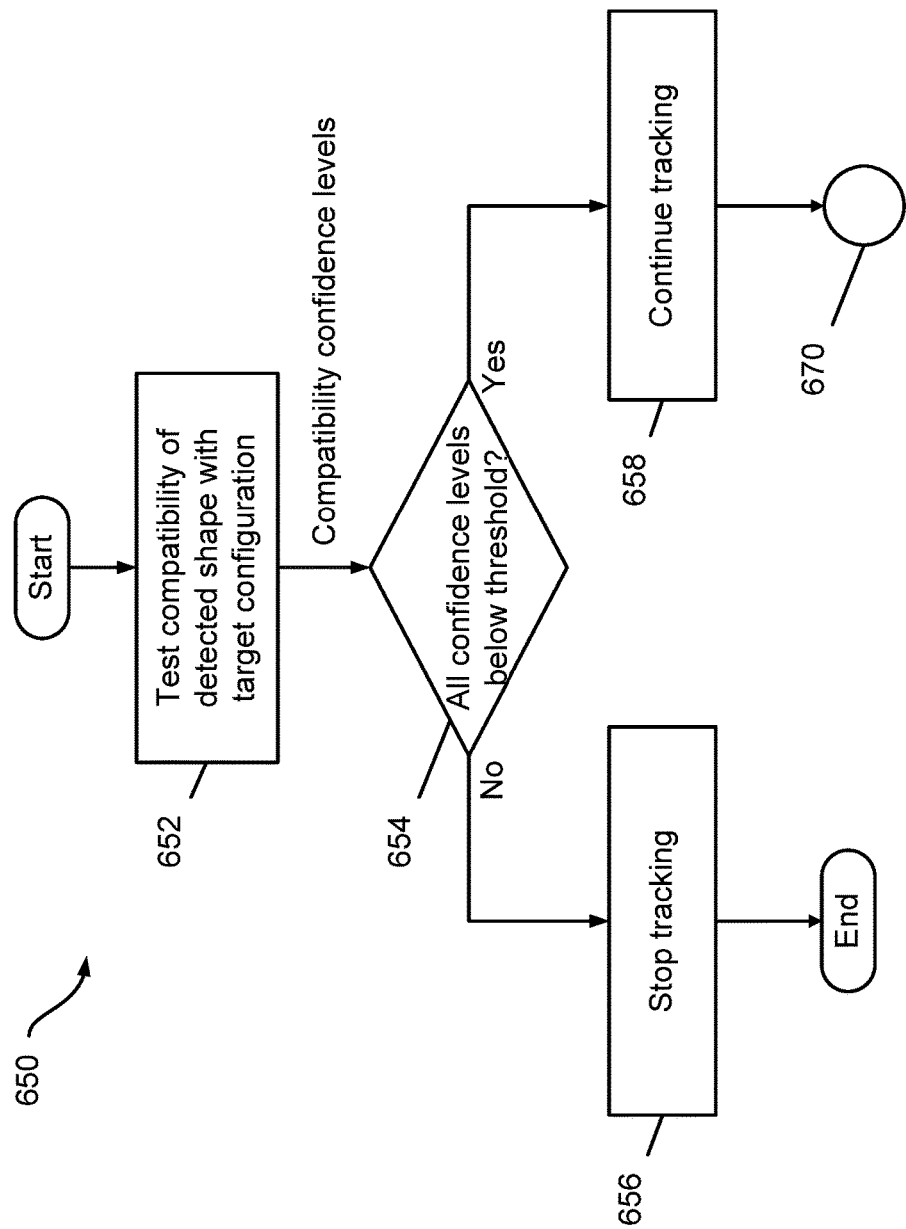
FIGS. 7A, 7B, and 7C are flowcharts illustrating methods for detecting a disengagement event according to some embodiments of the present invention.
Figure 7B:
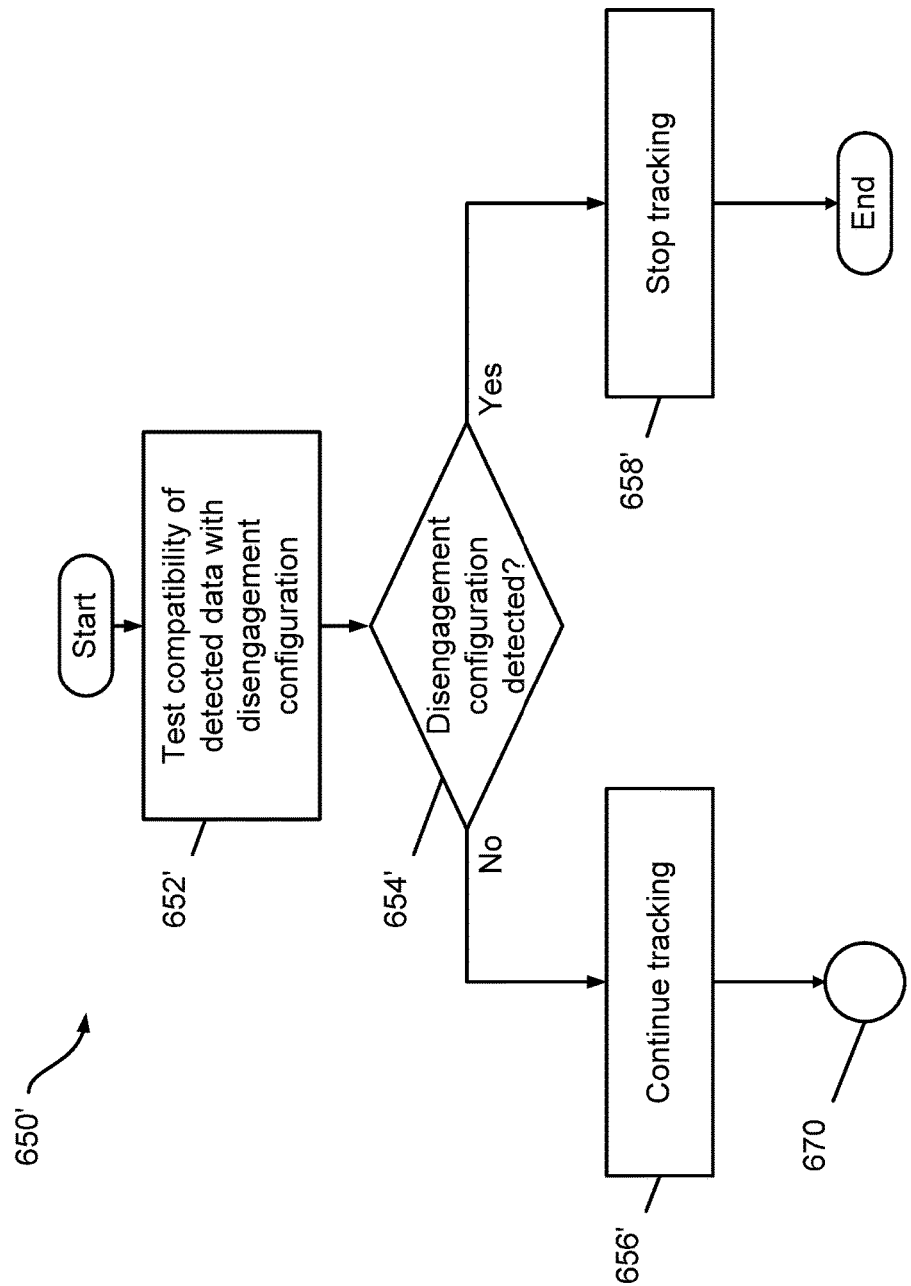

Therefore, in some embodiments of the present invention, the system detects a disengagement event in operation 650 to cause the system to stop tracking gestures made by the user. FIGS. 7A and 7B are flowcharts illustrating methods for detecting a disengagement event according to some embodiments of the present invention.

Referring to FIG. 7A, in one embodiment, the system tracks a particular shape (such as a pointing finger or open hand) when performing cursor control. In such embodiments, it is possible to perform a negative detection procedure (using hypothesis testing) to stop tracking when the tracked shape is no longer detected (e.g., when the user stops pointing a single finger or when the user closes his or her open hand). For example, at each detection event, the detected shape is tested for compatibility with the target configuration (e.g., a confidence with which the detected shape matches the shape of a hand with a pointing finger) in operation 652. The confidence levels of the compatibility are compared to a threshold value in operation 654. If all of the confidence levels are below the threshold value (e.g., the detected shape does not resemble any of the known ways that the target configuration could appear), then tracking stops in operation 656. However, if the detected shape does match the target configuration, then tracking continues in operation 658 and the process continues (e.g., by proceeding with determining if the interaction zone needs to be shifted in operation 670 of FIG. 6).

In some embodiments, in the case of an open hand and an acquisition system made by standard video cameras, it is possible to apply computer vision and machine learning techniques such as the analysis of Histograms of Gradients (HoG) to provide such a hypothesis testing analysis.

FIG. 7B illustrates another embodiment in which a specific disengagement gesture is be used to end tracking. For example, in the case of hand gesture based interactions, it may be natural for a user to lower his or her hand when the user is done with interacting with the system. In such a case, a downward motion of a particular length and over a particular time frame may be used to provide disengagement. In operation 652' the data from the acquisition system is compared with information regarding a disengagement configuration and, if the disengagement gesture is detected in 654', then the system stops tracking in operation 658'. In some embodiments, dynamic time warping techniques are applied to detect disengagement gestures.

Figure 7C:
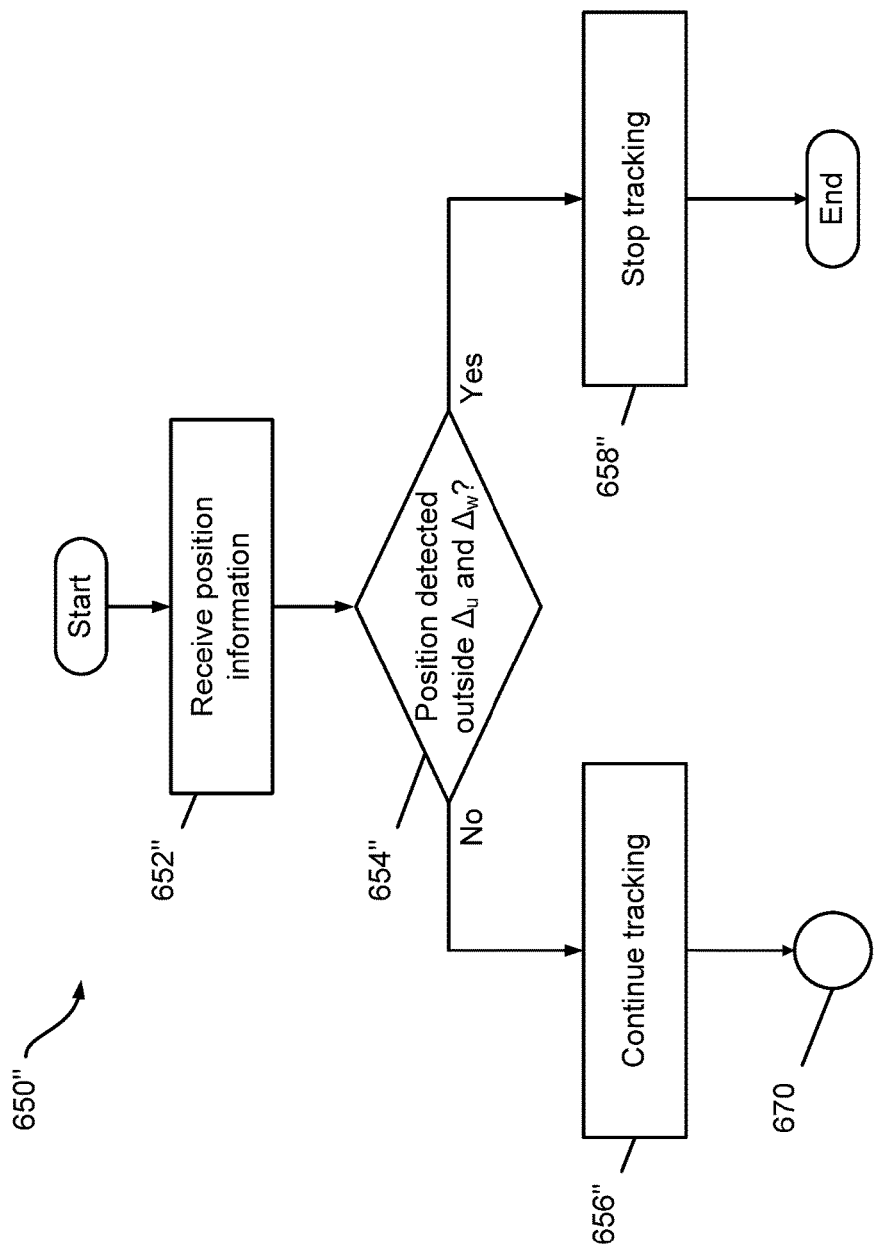

FIG. 7C illustrates another embodiment in which a disengagement event is detected when the image processing system 12 receives information in operation 652'' that the finger moves fast enough to transition from the inner interaction zone $\Delta_u$ into the outer interaction zone and subsequently out of the outer interaction zone $\Delta_w$, as detected in operation 654'', within a disengagement time period, such as before the interaction zone update time (e.g., 1 frame or ~33 ms, assuming that the acquisition system is operating at 30 frames per second).

Boundary Hysteresis

One aspect of embodiments of the present invention allows a user to reposition the interaction zone without changing the position of the cursor. For example, a user may make a wake up gesture at head height and then find that the interaction zone is uncomfortably high. Rather than disengage and reengage the gesture detection system, one embodiment of the present invention allows a user to "drag" the interaction zone to a more comfortable location. For example, if the interaction zone is too high, the user may move his or her hand in a downward direction. Initially, the cursor on screen would also move downward, but would eventually stop moving at the bottom edge of the user interface because its coordinates always lie within $[0 \ldots S_w]$ and $[0 \ldots S_h]$. For example, the cursor would be "pinned" or "clamped" at the edge of the screen in the same way that a mouse cursor would typically pinned at the edge of a screen even if the user continued moving the physical mouse.

Nevertheless, the user's hand would continue moving downward and the gesture detection system would continue tracking the hand and continue updating the position of the inner and outer interaction zones $\Delta_u$ and $\Delta_w$. Once the user had lowered his or her hand to comfortable height, raising the hand would immediately cause cursor movement in the upward direction (e.g., in the same way that a mouse cursor would move upward once a user moved in the opposite direction). As such, the distance moved by the hand to bring the cursor down to the bottom of the display is longer than the distance moved by the hand to bring the cursor back up to the center of the display, and this difference may be referred to herein as "boundary hysteresis."

Figure 8:
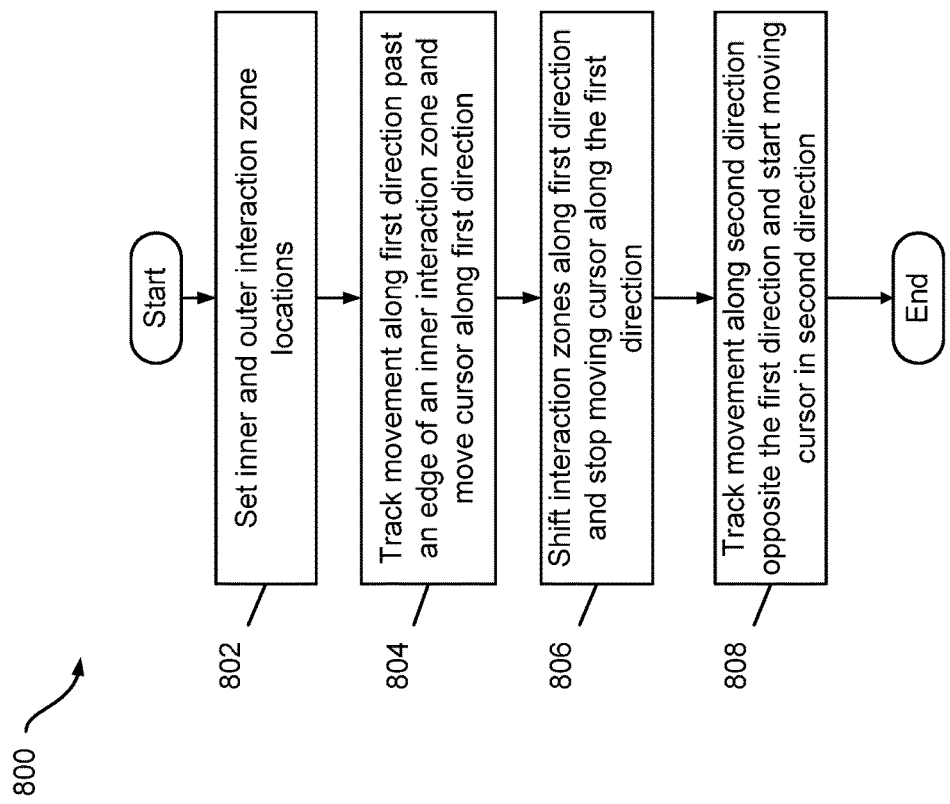
FIG. 8 is a flowchart illustrating a method for repositioning an interaction zone according to one embodiment of the present invention.

FIG. 8 is a flowchart illustrating a method for repositioning an interaction zone according to one embodiment of the present invention. In operation 802, inner and outer interaction zone locations may be set and tracked as described above. In operation 804, the movement of an interaction medium 50 along a first direction (e.g., a downward direction) may then be tracked past the edge of the interaction zones and a cursor displayed on the user interface may be moved along the first direction in response to the tracked movement. The interaction zones are shifted along the first direction in operation 806 and the cursor stops moving (e.g., because the cursor has reached a boundary such as the edge of the screen). In operation 808, the image processing system 12 begins tracking movement along a second direction opposite the first direction (e.g., movement in an upward direction) and concurrently begins moving the cursor in the second direction.

As such, aspects of embodiments of the present invention allow a user to reposition an interaction zone in a manner that parallels the repositioning of a mouse on a mousepad or the repositioning of a finger on a touchpad.

Therefore, aspects of embodiments of the present invention allow non-linear remapping of gestures to a display device as well as tracking within an entire field of view of the acquisition system while maintaining benefits of a relatively small interaction zone. These aspects provide a more familiar interface for users accustomed to using standard computer mice and trackpads. The non-linear mapping allows users to have more precise control by slowing down the velocity of their interactions while also allowing more agile interactions by making more rapid movements. The nonlinear remapping may also include parameters that can be adjusted by a user to control the sensitivity and response characteristics of the system.

In addition, aspects of embodiments of the present invention allow decoupling of the 2D position of the cursor on the screen from the absolute 3D position of the interaction medium in space, thereby allowing remapping based on relative movements in the 3D space. This also allows a user to control the system from very different regions within the field of view of the acquisition system during an interaction session without actively disengaging and reengaging the detection system.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof. For example, the features and aspects described herein may be implemented independently, cooperatively or alternatively without deviating from the spirit of the disclosure.

What is claimed is:

1. A real-time gesture based interactive system comprising:
   a processor;
   an acquisition system configured to capture a sequence of frames of data for constructing a depth map of a field of view of the acquisition system;
   memory storing an interaction medium tracking application, the interaction medium tracking application configuring the processor to:
      obtain the data from the acquisition system;
      compare successive frames of the frames of data for portions that change from one frame to the next;
      determine whether any of the portions that changed are part of an interaction medium detected in the sequence of frames of data;
      define an inner 3D interaction zone relative to an initial position of the part of the interaction medium detected in the sequence of frames of data, where the inner 3D interaction zone corresponds to a bounded region that is less than the frame of data and that contains the part of the interaction medium detected in the sequence of frames of data;
      track a movement of the interaction medium in the data to generate a plurality of 3D positions of the interaction medium;
      detect movement of the interaction medium from inside to outside the inner 3D interaction zone at a boundary 3D position;
      shift the inner 3D interaction zone relative to the boundary 3D position;
      compute a plurality of computed positions based on the 3D positions; and
      supply the computed positions to control an application.

2. The system of claim 1, wherein each of the computed positions includes an x component, a y component, and a z component.

3. The system of claim 1, wherein the acquisition system comprises at least one of:
   a plurality of cameras in a stereo arrangement having overlapping fields of view;
   an infrared camera;
   a color visible light camera; and
   an illumination source configured to generate at least one of visible light, infrared light, ultrasonic waves, and electromagnetic signals.

4. The system of claim 1, wherein the memory further stores instructions of the interaction medium tracking application to configure the processor to:
   compute a 3D velocity of the interaction medium within the inner 3D interaction zone based on the 3D positions; and
   compute two-dimensional movement data corresponding to the 3D positions and the 3D velocity, differences in the two-dimensional movement data being non-linear with respect to differences in the 3D positions.

5. The system of claim 1, wherein the interaction medium is a portion of a human body.

6. The system of claim 1, wherein the memory further stores instructions of the interaction medium tracking application to configure the processor to detect the movement of the interaction medium from the inside to the outside of the inner 3D interaction zone based on the 3D positions.

7. The system of claim 1, wherein the memory further stores instructions of the interaction medium tracking application to configure the processor to detect the movement of the interaction medium from the inside to the outside of the inner 3D interaction zone by detecting a coarse movement of the interaction medium within an entire portion of the field of view of the acquisition system.

8. The system of claim 1, wherein the memory further stores instructions of the interaction medium tracking application to configure the processor to:
   detect a disengagement event; and
   stop tracking the movement of the interaction medium in response to the disengagement event.

9. The system of claim 8, wherein the memory further stores instructions of the interaction medium tracking application to configure the processor to detect the disengagement event by:
   comparing the interaction medium detected in the frames of data to a target configuration to generate a compatibility confidence level; and
   detecting the disengagement event when the confidence level is below a threshold level.

10. The system of claim 8, wherein the memory further stores instructions of the interaction medium tracking application to configure the processor to detect the disengagement event by:
    comparing the interaction medium detected in the frames of data to a disengagement configuration; and
    detecting the disengagement event when the disengagement configuration is detected.

11. The system of claim 1, wherein the memory further stores instructions of the interaction medium tracking application to configure the processor to:
    track the movement of the interaction medium along a first direction toward a boundary of the inner interaction zone and concurrently update the plurality of computed positions in accordance with the movement along the first direction;
    shift the inner interaction zone along the first direction and concurrently stop updating the plurality of computed positions in accordance with movement along the first direction; and
    track the movement of the interaction medium along a second direction opposite the first direction and concurrently start updating the plurality of computed positions in accordance with the movement along the second direction.

12. A real-time gesture based interactive system comprising:
    a processor;
    an acquisition system configured to capture a sequence of frames of data for constructing a depth map of a field of view of the acquisition system;
    memory storing an interaction medium tracking application, the interaction medium tracking application configuring the processor to:
       obtain the data from the acquisition system;
       compare successive frames of the frames of data for portions that change from one frame to the next;

determine whether any of the portions that changed are part of an interaction medium detected in the sequence of frames of data;

define an inner 3D interaction zone relative to an initial position of the part of the interaction medium detected in the sequence of frames of data, where the inner 3D interaction zone corresponds to a bounded region that is less than the frame of data and that contains the part of the interaction medium detected in the sequence of frames of data;

track a movement of the interaction medium in the data to generate a plurality of 3D positions of the interaction medium;

compute a 3D velocity of the interaction medium within the inner 3D interaction zone based on the 3D positions;

compute a plurality of computed positions based on the 3D positions and the 3D velocity, differences in the computed positions being non-linear with respect to differences in the 3D positions; and supply the computed positions to control an application.

13. The system of claim 12, wherein each of the computed positions includes an x component, a y component, and a z component.

14. The system of claim 12, wherein the 3D velocity comprises a horizontal component $v_x$ and a vertical component $v_y$, and wherein the 3D velocity is thresholded by a minimum threshold $T_m$ and a maximum threshold $T_M$ to compute thresholded 3D velocities a and b, where:

$$a = \min(\max(|v_x{}^t|, T_m), T_M)$$

$$b = \min(\max(|v_y{}^t|, T_m), T_M).$$

15. The system of claim 14, wherein the real-time gesture based interactive system further comprises a display device having $S_w$ columns and $S_h$ rows, wherein the plurality of computed positions comprises column data c and row data r corresponding to coordinates of the display device, and wherein the 3D velocity and the thresholded 3D velocities are mapped onto the column data c and the row data r, where:

$$c_t = \min(\max(c_{t-1} - v_x{}^t * K * a, 0), S_w)$$

$$r_t = \min(\max(r_{t-1} - v_y{}^t * K * b, 0), S_h),$$

and where K is a sensitivity parameter.

16. A method for operating a real-time gesture based interactive system, the method comprising:

obtaining a sequence of frames of data from an acquisition system configured to capture data for constructing a depth map of a field of view of the acquisition system;

comparing, by a processor, successive frames the frames of data for portions that change from one frame to the next;

determining, by the processor, whether any of the portions that changed are part of an interaction medium detected in the sequence of frames of data;

defining, by the processor, an inner 3D interaction zone relative to an initial position of the part of the interaction medium detected in the sequence of frames of data, where the inner 3D interaction zone corresponds to a bounded region that is less than the frame of data and that contains the part of the interaction medium detected in the sequence of frames of data;

tracking, by the processor, a movement of the interaction medium in the data to generate a plurality of 3D positions of the interaction medium;

detecting, by the processor, movement of the interaction medium from inside to outside the inner 3D interaction zone at a boundary 3D position;

shifting, by the processor, the inner 3D interaction zone relative to the boundary 3D position;

computing, by the processor, a plurality of computed positions based on the 3D positions; and supplying the computed positions to control an application.

17. The method of claim 16, wherein each of the computed positions includes an x component, a y component, and a z component.

18. The method of claim 16, wherein the acquisition system comprises at least one of:
a plurality of cameras in a stereo arrangement having overlapping fields of view;
an infrared camera;
a color visible light camera; and
an illumination source configured to generate at least one of visible light, infrared light, ultrasonic waves, and electromagnetic signals.

19. The method of claim 16, further comprising:
computing a 3D velocity of the interaction medium within the inner 3D interaction zone based on the 3D positions; and
computing two-dimensional movement data corresponding to the 3D positions and the 3D velocity, differences in the two-dimensional movement data being non-linear with respect to differences in the 3D positions.

20. The method of claim 16, wherein the interaction medium is a portion of a human body.

21. The method of claim 16, further comprising detecting the movement of the interaction medium from the inside to the outside of the inner 3D interaction zone based on the 3D positions.

22. The method of claim 16, further comprising detecting the movement of the interaction medium from the inside to the outside of the inner 3D interaction zone by detecting a coarse movement of the interaction medium within an entire portion of the field of view of the acquisition system.

23. The method of claim 16, further comprising:
detecting a disengagement event; and
stopping tracking the movement of the interaction medium in response to the disengagement event.

24. The method of claim 23, wherein the detecting the disengagement event comprises:
comparing the interaction medium detected in the frames of data to a target configuration to generate a compatibility confidence level; and
detecting the disengagement event when the confidence level is below a threshold level.

25. The method of claim 23, wherein the detecting the disengagement event comprises:
comparing the interaction medium detected in the frames of data to a disengagement configuration; and
detecting the disengagement event when the disengagement configuration is detected.

26. The method of claim 16, further comprising:
tracking the movement of the interaction medium along a first direction toward a boundary of the inner interaction zone and concurrently update the plurality of computed positions in accordance with the movement along the first direction;

shifting the inner interaction zone along the first direction and concurrently stop updating the plurality of computed positions in accordance with movement along the first direction; and tracking the movement of the interaction medium along a second direction opposite the first direction and concurrently start updating the plurality of computed positions in accordance with the movement along the second direction.

27. A method for tracking a gesture comprising:

obtaining a sequence of frames of data from an acquisition system configured to capture data for constructing a depth map of a field of view of the acquisition system;

comparing, by a processor, successive frames of the frames of data for portions that change from one frame to the next;

determining, by the processor, whether any of the portions that changed are part of an interaction medium detected in the sequence of frames of data;

defining, by the processor, an inner 3D interaction zone relative to an initial position of the part of the interaction medium detected in the sequence of frames of data, where the inner 3D interaction zone corresponds to a bounded region that is less than the frame of data and that contains the part of the interaction medium detected in the sequence of frames of data;

tracking, by the processor, a movement of the interaction medium in the data to generate a plurality of 3D positions of the interaction medium;

computing, by the processor, a 3D velocity of the interaction medium within the inner 3D interaction zone based on the 3D positions;

computing, by the processor, a plurality of computed positions based on the 3D positions and the 3D velocity, differences in the computed positions being non-linear with respect to differences in the 3D positions; and supplying, by the processor, the computed positions to control an application.

28. The method of claim 27, wherein each of the computed positions includes an x component, a y component, and a z component.

29. The method of claim 27, wherein the 3D velocity comprises a horizontal component $v_x$ and a vertical component $v_y$, and wherein the 3D velocity is thresholded by a minimum threshold $T_m$ and a maximum threshold $T_M$ to compute thresholded 3D velocities a and b, where:

$$a = \min(\max(|v_x^t|, T_m), T_M)$$

$$b = \min(\max(|v_y^t|, T_m), T_M).$$

30. The method of claim 29, wherein the application includes a user interface displayed on a display device having $S_w$ columns and $S_h$ rows, wherein the plurality of computed positions comprises column data c and row data r corresponding to coordinates of the display device, and wherein the 3D velocity and the thresholded 3D velocities are mapped onto the column data c and the row data r, where:

$$c_t = \min(\max(c_{t-1} - v_x^t * K * a, 0), S_w)$$

$$r_t = \min(\max(r_{t-1} - v_y^t * K * b, 0), S_h),$$

and where K is a sensitivity parameter.

* * * * *